US009276751B2

(12) United States Patent
Mosko et al.

(10) Patent No.: US 9,276,751 B2
(45) Date of Patent: Mar. 1, 2016

(54) SYSTEM AND METHOD FOR CIRCULAR LINK RESOLUTION WITH COMPUTABLE HASH-BASED NAMES IN CONTENT-CENTRIC NETWORKS

(71) Applicant: Palo Alto Research Center Incorporated, Palo Alto, CA (US)

(72) Inventors: Marc E. Mosko, Santa Cruz, CA (US); Ignacio Solis, South San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/289,463

(22) Filed: May 28, 2014

(65) Prior Publication Data
US 2015/0349961 A1  Dec. 3, 2015

(51) Int. Cl.
*G06F 7/00* (2006.01)
*H04L 9/32* (2006.01)

(52) U.S. Cl.
CPC ........... *H04L 9/3242* (2013.01); *H04L 2209/24* (2013.01)

(58) Field of Classification Search
CPC . H04L 45/00; H04L 45/748; H04L 29/12613; H04L 45/64; H04L 61/301; H04L 65/1069; H04L 67/327
USPC .......................................... 235/375; 370/389
See application file for complete search history.

(56) References Cited

U.S. PATENT DOCUMENTS

| 817,441 | A | 4/1906 | Niesz |
|---|---|---|---|
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,506,844 | A | 4/1996 | Rao |
| 5,629,370 | A | 5/1997 | Freidzon |
| 5,870,605 | A | 2/1999 | Bracho |
| 6,052,683 | A | 4/2000 | Irwin |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Seung Lee

(74) *Attorney, Agent, or Firm* — Shun Yao; Park, Vaughan, Fleming & Dowler LLP

(57) ABSTRACT

One embodiment of the present invention provides a system for constructing a linked object. During operation, the system constructs a first portion of the linked object. The first portion includes at least one or more data items and a computable identifier calculated based on the one or more data items, and the first portion is referenced by a self-certified name associated with the linked object. The system constructs a second portion of the linked object. The second portion includes at least the computable identifier and an external link that references a second linked object using a self-certified name associated with the second linked object.

25 Claims, 10 Drawing Sheets

(56) References Cited

U.S. PATENT DOCUMENTS

| | | | |
|---|---|---|---|
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,751,664 B2* | 6/2014 | Jacobson .......... H04L 29/12613 709/219 |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,862,774 B2 | 10/2014 | Vasseur |
| 8,937,865 B1 | 1/2015 | Kumar |
| 8,972,453 B2* | 3/2015 | Wu .......................... 707/758 |
| 9,071,498 B2 | 6/2015 | Beser |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |

(56) References Cited

U.S. PATENT DOCUMENTS

| | | |
|---|---|---|
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1* | 8/2010 | Jacobson ............ H04L 45/748 370/392 |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0282727 A1* | 11/2011 | Phan ............... G06Q 10/10 705/14.36 |
| 2011/0286457 A1 | 11/2011 | Ee |
| 2011/0286459 A1 | 11/2011 | Rembarz |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |

(56) References Cited

U.S. PATENT DOCUMENTS

| | | |
|---|---|---|
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
Detti et al., "Supporting the Web with an information centric network that routes by name", Aug. 2012, Computer Networks 56, pp. 3705-3702.
Garcia-Luna-Aceves et al., "Automatic Routing Using Multiple Prefix Labels", 2012, IEEE, Ad Hoc and Sensor Networking Symposium.
Hoque et al., 'NLSR: Named-data Link State Routing Protocol', Aug. 12, 2013, ICN 2013, pp. 15-20.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
L. Wang et al., 'OSPFN: An OSPF Based Routing Protocol for Named Data Networking,' Technical Report NDN-0003, 2012.
Merindol et al., "An efficient algorithm to enable path diversity in link state routing networks", Jan. 10, Computer Networks 55 (2011), pp. 1132-1140.
Soh et al., "Efficient Prefix Updates for IP Router Using Lexicographic Ordering and Updateable Address Set", Jan. 2008, IEEE Transactions on Computers, vol. 57, No. 1.
V. Jacobson et al., 'Networking Named Content,' Proc. IEEE CoNEXT '09, Dec. 2009.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Lynn$2E.
C. Gentry and A. Silverberg. Hierarchical ID-Based Cryptography. Advances in Cryptology—ASIACRYPT 2002. Springer Berlin Heidelberg (2002).
D. Boner, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Sympo.
H. Xiong, X. Zhang, W. Zhu, and D. Yao. CloudSeal: End-to$2.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer ScienceVolume 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/ www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.

(56) References Cited

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication

(56) References Cited

OTHER PUBLICATIONS paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft,"Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

(56) References Cited

OTHER PUBLICATIONS

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

D. Trossen and G. Parisis, "Designing and realizing and information-centric internet," IEEE Communications Magazing, vol. 50, No. 7, pp. 60-67, Jul. 2012.

Gasti, Paolo et al., 'DoS & DDoS in Named Data Networking', 2013 22nd International Conference on Computer Communications and Networks (ICCCN), Aug. 2013, pp. 1-7.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

* cited by examiner

SYSTEM AND METHOD FOR CIRCULAR LINK RESOLUTION WITH COMPUTABLE HASH-BASED NAMES IN CONTENT-CENTRIC NETWORKS

RELATED APPLICATIONS

The subject matter of this application is related to the subject matter in the following applications:
U.S. patent application Ser. No. 14/286,744, entitled "SYSTEM AND METHOD FOR CIRCULAR LINK RESOLUTION WITH HASH-BASED NAMES IN CONTENT-CENTRIC NETWORKS," by inventors Marc E. Mosko and Ignacio Solis, filed 23 May 2014;
the disclosure of which is incorporated herein by reference in its entirety.

BACKGROUND

1. Field

The present disclosure relates generally to a content-centric network (CCN). More specifically, the present disclosure relates to a system and method for resolving circular references in content-centric networks (CCNs).

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture, brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, names play an important role. More specifically, Content objects and Interests are identified by their name, which is typically a hierarchically structured variable-length identifier (HSVLI). Interests and Content Objects flow through the network based on their names. Some CCN implementations rely on self-certified, hash-based names to refer and identify content, which can be problematic when two Content Objects refer to each other by their hash-based names.

SUMMARY

One embodiment of the present invention provides a system for constructing a linked object. During operation, the system constructs a first portion of the linked object. The first portion includes one or more data items and a computable identifier calculated based on the one or more data items, and the first portion is referenced by a self-certified name associated with the linked object. The system constructs a second portion of the linked object. The second portion includes at least the computable identifier and an external link that references a second linked object using a self-certified name associated with the linked object.

In a variation on this embodiment, the computable identifier is obtained by computing a hash value over the one or more data items.

In a variation on this embodiment, the self-certified name associated with the linked object is a hash-based name obtained by applying a hash function to the first portion.

In a further variation, the hash function includes a cryptographic hash function.

In a variation on this embodiment, the first portion further comprises a component with a pre-determined value.

In a variation on this embodiment, the linked object is a content object in a content-centric network (CCN), and the one or more data items include a name and a signing key.

In a further variation, the second portion further includes a cryptographic signature obtained using the signing key.

In a variation on this embodiment, the second linked content object includes a link that references the linked object using the self-certified name associated with the linked object, thereby facilitating a circular reference between the linked object and the second linked object.

BRIEF DESCRIPTION OF THE FIGURES

In the figures, like reference numerals refer to the same figure elements.

DETAILED DESCRIPTION

Overview

Figure 1:
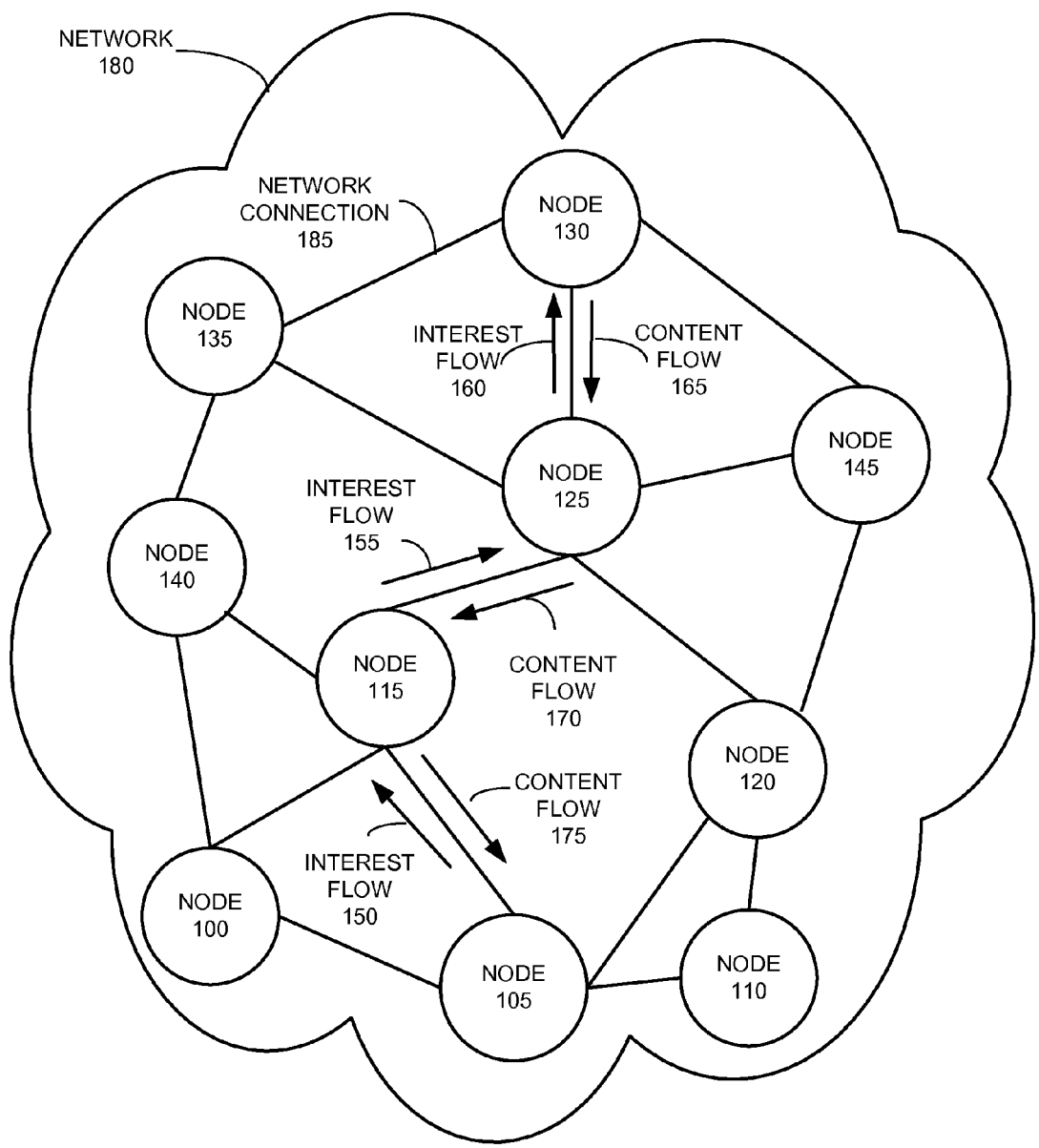
FIG. 1 illustrates an exemplary architecture of a network, in accordance with an embodiment of the present invention.

Embodiments of the present invention provide a system and method for resolving the circular reference problem faced by hash-based names in CCNs. More specifically, each linked Content Object includes two inter-related parts, with the first part including the name and the signing key and the second part including the payload. A computable identifier based on the name and the signing key is also included in both the first part and the second part. A cryptographic signature binds these two parts to each other. In addition, a hash value generated over the first part is used as the Content Object hash for referencing of this Content Object.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially, the Content Object follows the breadcrumbs left by the Interest message and thus reaches the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

In CCN, each node maintains three major data structures, including a Forwarding Information Base (FIB), a Content Store (CS), and a Pending-Interest Table (PIT).

FIB is used to forward Interest packets toward potential source(s) of matching Content Objects. Typically, a routing protocol is used to populate the FIB among all nodes in the network. The FIB entries are often indexed by the name prefixes, with each entry including a physical address of at least one face to which the matching Interest should be forwarded. While forwarding Interest messages, longest-prefix-match lookups of names are performed at the FIB to find a matching entry.

Content Store (CS) is similar to the buffer memory used in an IP router. More particularly, CS temporarily buffers Content Objects that pass through this node, allowing efficient data retrieval by different consumers. When a router receives an Interest packet, it first checks whether there is a matching Content Object in its content store.

Pending-Interest Table (PIT) keeps track of Interests forwarded upstream toward content source(s) so that a returned Content Object can be sent downstream to its requester(s). In CCN, only Interest packets are routed. The returning Content Object follows the trail of the Interest packet back to the content requester. A PIT entry for an Interest specifies the name of the Interest and one or multiple incoming faces that requested that Interest.

When an Interest packet arrives on a certain face, a longest-match lookup is done based on the content name, or the HSVLI. The index structure used for the name lookup is ordered in such a way that a CS match will be preferred over a PIT match, which will be preferred over an FIB match. Hence, if there is already a Content Object in CS that matches the Interest, the Content Object will be sent out via the face the Interest arrived on and the Interest will be discarded. Otherwise, the PIT will be checked to see if a match can be found. If so, the Interest's arrival face will be added to the PIT entry's requesting face list and the Interest will be discarded. Otherwise, the FIB will be checked and the Interest is forwarded along the one or more faces listed in the matching FIB entry.

Figure 2:
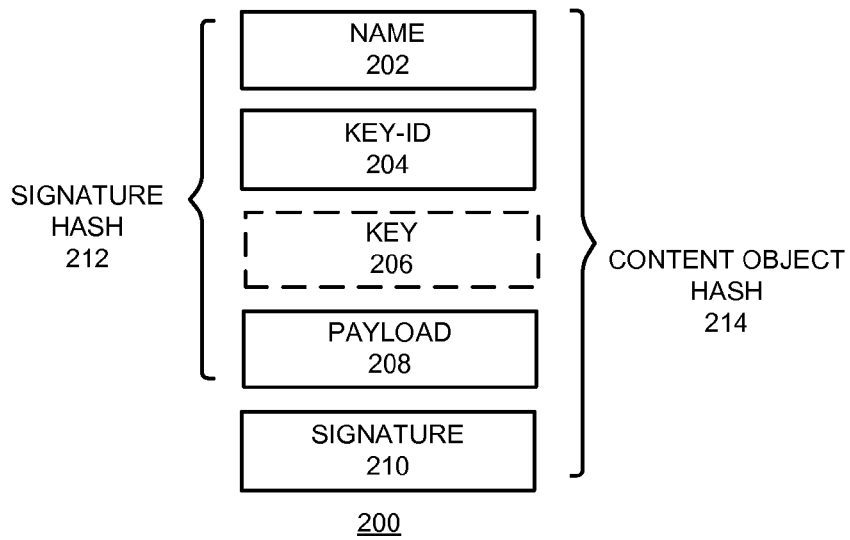
FIG. 2 presents a diagram illustrating an exemplary standard Content Object.

In CCN, a Content Object can include a number of components, such as a name, a key-ID, a payload, and a signature. FIG. 2 presents a diagram illustrating an exemplary Content Object. In FIG. 2, Content Object 200 includes a name component 202, a key-ID component 204, an optional key component 206, a payload component 208, and a signature component 210. Name component 202 is a non-cryptographic user-assigned string, which can be an HSVLI in a human-readable form or a flat name. Key-ID component 204 identifies a public key used to sign Content Object 200. The public key can be optionally included in Content Object 200 as key component 206. Payload component 208 includes the user data. Signature component 210 is a cryptographic signature that binds name component 202 to payload component 208. The signature can be generated using an RSA scheme. For example, the publisher of the content can generate the signature using its private key, which is verifiable using public key 206. Note that, instead of signing all the bytes, the signature is usually generated by signing a hash of name component 202, key-ID component 204, key component 206, and payload component 208, shown as signature hash 212. An additional name of Content Object 200, which is known as a Content Object hash 214, is the hash value computed over all components of Content Object 200. A description of the hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated herein by reference.

In CCN, there are multiple ways to request Content Objects. A straightforward way is to request a Content Object by its CCN name, such as its HSVLI. However, such a scheme is insecure, and may result in the requester receiving fake content with the requested name. An alternative is to request Content Object by a name and a key-ID. Although the requester cannot verify the signatures before receiving the Content Object, it can perform such checking and re-request the Content Object if the signature does not match. The third way to request a Content Object is to request it by the CCN name of the Content Object along with the Content Object hash. Requesting an object by the CCN name and the Content Object hash ensures that the requester is guaranteed to receive the correct Content Object if routing is performed correctly.

In CCN, Content Objects may include web documents. In conventional networks, the web documents may refer to each other, forming a highly connected mesh. The links among the documents may form many cycles. For example, a webpage A may refer to a webpage B, which refers to a webpage C, which refers to back to A, forming a link cycle of A-B-C-A. Such cyclic links can cause problems in systems that use self-certified names, such as hash-based names, because the names are created based on an intrinsic object property. In the aforementioned example, if the system uses hash-based names for webpages A, B, and C, then the A-B-C-A cycle is not allowed. Note that, in order for webpage A to refer to webpage B, A needs to know the hash value of B. B, on the other hand, refers to C, meaning it needs to know the hash of C. C refers to A, and needs to know the name of A. However, the name of A cannot be resolved until the name of B is known, which depends on the name of C. As one can see, using hash-based names as shown in FIG. 2 prevents the use of circular references. In other words, a Content Object, such as Content Object 200 shown in FIG. 2, cannot include links in its payload to other Content Objects using their Content Object hash name if such links would form a cycle.

Linked Content Objects

To solve the circular reference problems in systems that rely on hash-based names, in some embodiments of the present invention, linked Content Objects are used to replace conventional Content Objects when links to other objects are needed. More specifically, a linked Content Object can include two parts, with a first part being the conventional Content Object plus a nonce field, and the second part including the links to other objects and the same nonce field. The Content Object hash, or the name hash that can be used to reference the Content Object, is created over the first part only.

Figure 3:
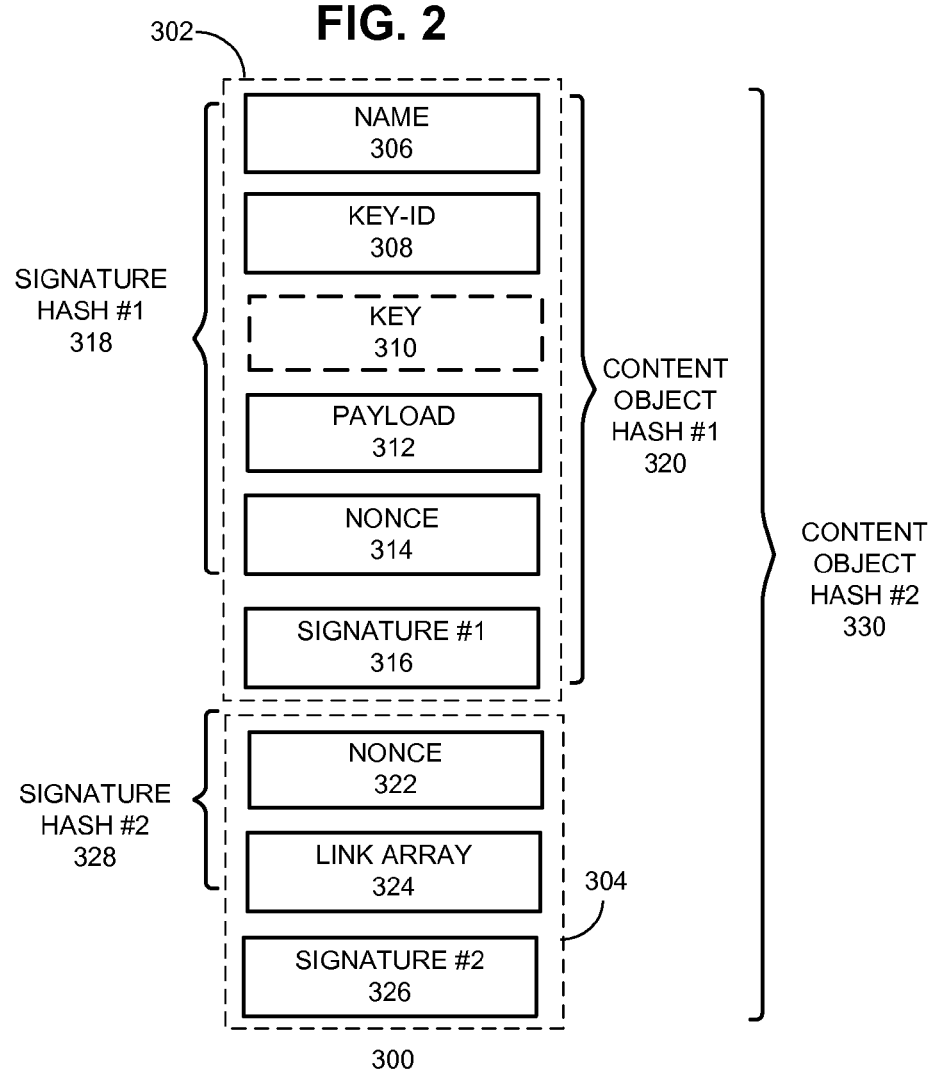
FIG. 3 presents a diagram illustrating an exemplary linked Content Object, in accordance with an embodiment of the present invention.

FIG. 3 presents a diagram illustrating an exemplary linked Content Object, in accordance with an embodiment of the present invention. In FIG. 3, linked Content Object 300 includes a first portion 302, also called the named portion, and a second portion 304, also called the linked portion. First portion or named portion 302 is similar to Content Object 200 shown in FIG. 2, and includes a name component 306, a key-ID component 308, an optional key component 310, a payload component 312, and a signature component 316. Additionally, named portion 302 of Content Object 300 includes a nonce component 314. Name component 306, key-ID component 308, optional key component 310, and payload component 312 shown in FIG. 3 are similar to name component 202, key-ID component 204, optional key component 206, and payload component 208 shown in FIG. 2. Nonce component 314 includes a randomly generated unique number within the scope of the key-ID. This unique number is used to tie named portion 302 to linked portion 304. The signature (signature #1) included in signature component 316 is generating by signing, using the publisher's private key, a signature hash #1 318, which is a hash of name component 306, key-ID component 308, optional key component 310, payload component 312, and nonce component 314. Once the signature #1 is generated, the system can generate a Content Object hash #1 (component 320), which is a hash value computed over name component 306, key-ID component 308, optional key component 310, payload component 312, nonce component 314, and signature #1 316. In some embodiments, Content Object hash #1 320 can be computed using a cryptographic hash function. For example, Content Object hash #1 320 can include a SHA-256 16-byte hash, or other equivalent hashes.

In FIG. 3, second portion or linked portion 304 includes a nonce component 322, a link array component 324, and a signature component 326. Note that nonce component 322 is identical to nonce component 314. In addition, signature component 326 is generated by signing, using the same private key (as identified by key-ID 308), a signature hash #2 328, which is a hash of nonce 322 and link array 322. The same nonce and the same signing key used by named portion 302 and linked portion 304 ensure that a client receiving linked Content Object 300 can have a strong assurance that the same publisher created named portion 302 and linked portion 304, and that the set of links provided in linked portion 304 refers to links included in named portion 302. The system computes a Content Object hash #2 (component 330) by computing the hash value over entire Content Object 300, including name component 306, key-ID component 308, optional key component 310, payload component 312, nonce component 314, signature #1 316, nonce component 322, link array component 324, and signature #2 326.

Figure 4:
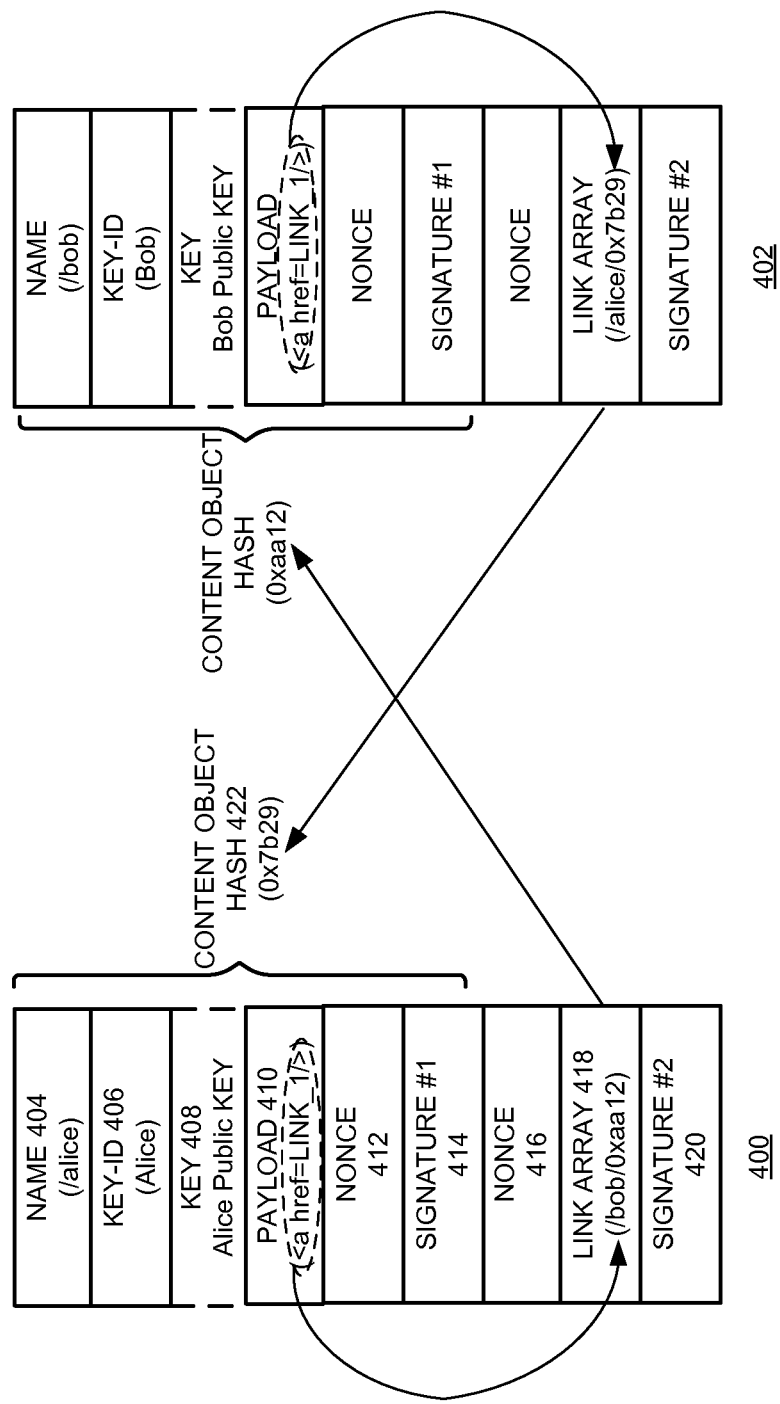
FIG. 4 presents a diagram illustrating an exemplary scenario of circular reference using linked Content Objects, in accordance with an embodiment of the present invention.

FIG. 4 presents a diagram illustrating an exemplary scenario of circular reference using linked Content Objects, in accordance with an embodiment of the present invention. In FIG. 4, a linked Content Object 400 and a linked Content Object 400 refer to each other. More specifically, Content Object 400 includes a name component 404, a key-ID component 406, an optional key component 408, a payload component 410, a nonce component 412, a signature #1 component 414, a nonce component 416, a link array component 418, and a signature #2 component 420. The Content Object hash (component 422) is calculated over name component 404, key-ID component 406, optional key component 408, payload component 410, nonce component 412, and signature #1 component 414. In the example shown in FIG. 4, the Content Object hash for Content Object 400 is calculated as "0x7b29." Note that in this example we use the 2-byte hash value for readability. In some embodiments, longer hash functions, such as a 16-byte long secure-hash-algorithm-256 (SHA-256) function or other equivalent or stronger hash functions are used to calculate the Content Object hash.

Name component 404 includes the CCN name of Content Object 400, such as "/alice;" key-ID component 406 and key component 408 include the key-ID and the corresponding public key. Nonce components 412 and 416 include the same random number. Payload component 410 includes the payload of Content Object 400. In the example shown in FIG. 4, the payload includes a reference to a link. Note that, in the example shown in FIG. 4, the link reference in payload component 410 is expressed using the HyperText Markup Language (HTML) syntax, such as <a href=LINK_1/>. In practice, the link reference can be expressed using a different syntax. The link reference does not directly link to another Content Object; instead, the link is placed in link array component 418. In the example shown in FIG. 4, the link reference (LINK_1) in payload component 410 points to an entry (/bob/0xaa12) listed in link array 418. The entry, /bob/0xaa12, includes the CCN name (/bob) of Content Object 402, and the Content Object hash (0xaa12) for Content Object 402.

On the other hand, Content Object 402 has a similar structure as that of Content Object 400. In the example shown in FIG. 4, the CCN name for Content Object 402 is "/bob," and Content Object 402 includes the key-ID and corresponding key used for signing Content Object 402. The payload in Content Object 402 also includes a reference or a pointer to a link (<a href=LINK_1/>), with the link being placed in the link library. More specifically, in Content Object 402, the link reference points to an entry in the link library, and the entry (/alice/0x7b29) includes the CCN name (/alice) of Content Object 400 and the Content Object hash (0x7b29) of Content Object 400.

In other words, Content Objects 400 and 402 refer to each other by referencing their Content Object hashes. Note that using hashes instead of CCN names as references can be essential in CCN systems, because the names may not be unique since a publisher may publish different content (or different versions of the content) under the same name. However, the Content Object hash is unique for each Content Object. As discussed previously, using hashes as references may cause problems when a circular-reference scenario occurs. The example shown in FIG. 4 explains how embodiments of the present invention solve such problems. In FIG. 4, instead of referencing a Content Object using a hash value computed over its entirety, the reference hash is computed based on a first portion of the Content Object, with the first portion containing only the name, the key information, and the payload. More specifically, the payload no longer includes any external links, or any links to other Content Objects. Instead, the payload includes one or more pointers that point to entries in the second portion of the Content Object, and the entries in the second portion can be used to resolve the external links. Note that the second portion is not included in the computation of the Content Object hash value. Hence, any reference to the Content Object using the Content Object hash does not rely on the second portion that contains information for resolving external links.

In the example shown in FIG. 4, Content Object 400 (named /alice) refers to Content Object 402 (named /bob) by its Content Object hash, and Content Object 402 refers to Content Object 400 by its Content Object hash, resulting in a circular reference situation. In conventional CCNs, such circular references may cause problems because the hash calculations are interdependent. However, in FIG. 4, calculations of the Content Object hashes no longer depend on each other, because the Content Object hash is not computed over the link array component, which holds the hash of the referenced Content Object. For example, in Content Object 400, the reference to Content Object 402 is accomplished by placing the Content Object hash of Content Object 402 (i.e, 0xaa12)

in link array component 418, which is not included in the calculation of Content Object hash 422. Hence, computing the Content Object hash of Content Object 400 no longer depends on any prior knowledge of the Content Object hash of Content Object 402. Similarly, in Content Object 402, the reference to Content Object 400 is accomplished by placing the Content Object hash of Content Object 400 (i.e., 0x7b29) into the link array, which is not included in the calculation of the Content Object hash of the Content Object 402. In other words, each object (Content Object 400 or Content Object 402) can independently calculate its own Content Object hash although the objects refer to each other. The calculated Content Object hash of one object is then placed into the second portion of the other object, facilitating the circular reference between the two objects.

To prevent a malicious user from injecting fake links into each Content Object, some embodiments of the present invention use the nonce component and the signature component to ensure that the content consumer can verify the validity of the links included in the second portion. More specifically, when the content consumer receives the Content Object, it can verify the signatures included in the first and the second portions. Note that they are signed with the same private key, and the content consumer can use a public key, as indicated by the key-ID, to verify both signatures. In addition, the content consumer can check the nonce included in the first portion (the named portion) of the object and the nonce included in the second portion (the linked portion) of the object to make sure that the link included in the second portion is indeed intended to refer to the first portion. This is essential because the same publisher may publish and sign Content Objects with the same payload but different link arrays. These Content Objects can be distinguished by the nonce. A mismatch in the nonce can indicate to the content consumer that links in the second portion are not intended to refer to the first portion, but are most likely swapped from a different Content Object.

Note that, although ideally when a publisher publishes Content Objects with the same payload and different link arrays it should generate different nonce components, there are situations where a publisher has published Content Objects having identical first portions but different second portions. For example, two web pages may appear to be the same, but a clicking on an embedded link can lead to different places. This can lead to ambiguity if both objects are identified by the hash of the first portion, or Content Object hash #1 component 320 shown in FIG. 3. To avoid ambiguity, while forwarding, a node may refer to one of the Content Objects using a hash value computed over the entire Content Object, i.e., Content Object hash #2 component 330 shown in FIG. 3. Detailed descriptions of the hash forwarding scheme can be found in U.S. patent application Ser. No. 14/065,961, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013, the disclosure of which is incorporated herein by reference in its entirety.

A publisher of a Content Object may update the content (payload), either irregularly or periodically. If the Content Object is constructed like the one shown in FIG. 3, updates to the payload result in a modification of the associated Content Object hash. Therefore, a different Content Object referencing the updated Content Object would have to update its reference (included in its second or linked portion) accordingly. In real life, it may be desirable to have a constant hash-based name for content that may change over time. For example, one may want to use a constant hash-based name to reference a website's homepage, although the content of the homepage may change over time. To accomplish this goal, in some embodiments of the present invention, the payload is placed in the second portion of the Content Object, and is no longer included the computation of the Content Object hash.

Figure 5:
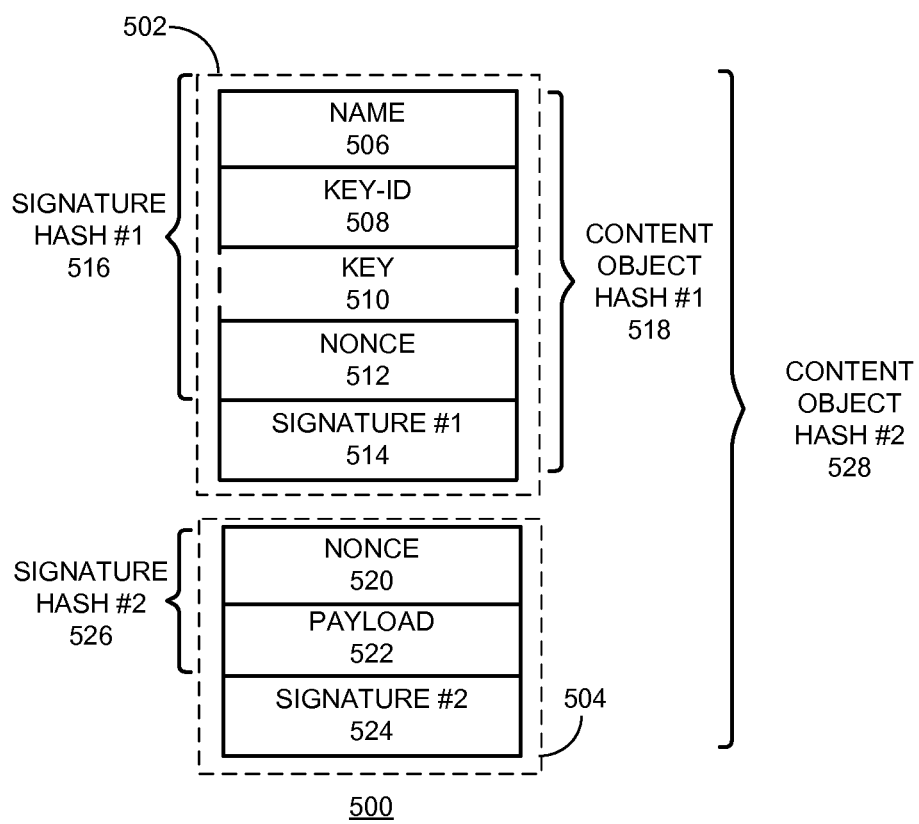
FIG. 5 presents a diagram illustrating an exemplary linked Content Object with deferred payload, in accordance with an embodiment of the present invention.

FIG. 5 presents a diagram illustrating an exemplary linked Content Object with deferred payload, in accordance with an embodiment of the present invention. In FIG. 5, linked Content Object 500 includes a first portion 502, also called the named portion, and a second portion 504, also called as the payload portion. First portion or named portion 502 includes a name component 506, a key-ID component 508, an optional key component 510, a nonce component 512, and a signature #1 component 514. Signature #1 component 514 includes a signature signed over signature hash #1 516, which is a hash value computed over name component 506, key-ID component 508, optional key component 510, and nonce component 512. A hash value is computed over entire first portion 502 to generate Content Object hash #1 518.

Second portion or payload portion 504 of Content Object 500 includes a nonce component 520, a payload component 522, and a signature #2 component 524. Signature #2 component 524 includes a signature signed over signature hash #2 526, which is a hash value computed over nonce component 520 and payload component 522. An additional hash value is computed over entire Content Object 500 to generate Content Object hash #2 528. Note that compared with FIG. 3, in FIG. 5, payload 522 replaces link array 324 in the linked portion of the Content Object. In some embodiments, the second portion may include both the payload and the link array.

In the example shown in FIG. 5, because payload 522 is not included in the computation of Content Object hash #1 518, any reference to Content Object 500 using Content Object hash #1 518 is not affected by changes of payload 522. This gives the publisher greater control over what content to be returned to a request with a certain hash. For example, in cases where a publisher may publish, after a Content Object expires in the cache, a new Content Object with the same hash-based name (having the identical first portion), deferring the payload to the second portion makes this process invisible to users requesting the content using the constant hash-based name. The user would not be aware of this content update. Nonce component 512 and nonce component 520 are identical, and are used to tie payload portion 504 to named portion 502.

Figure 6:
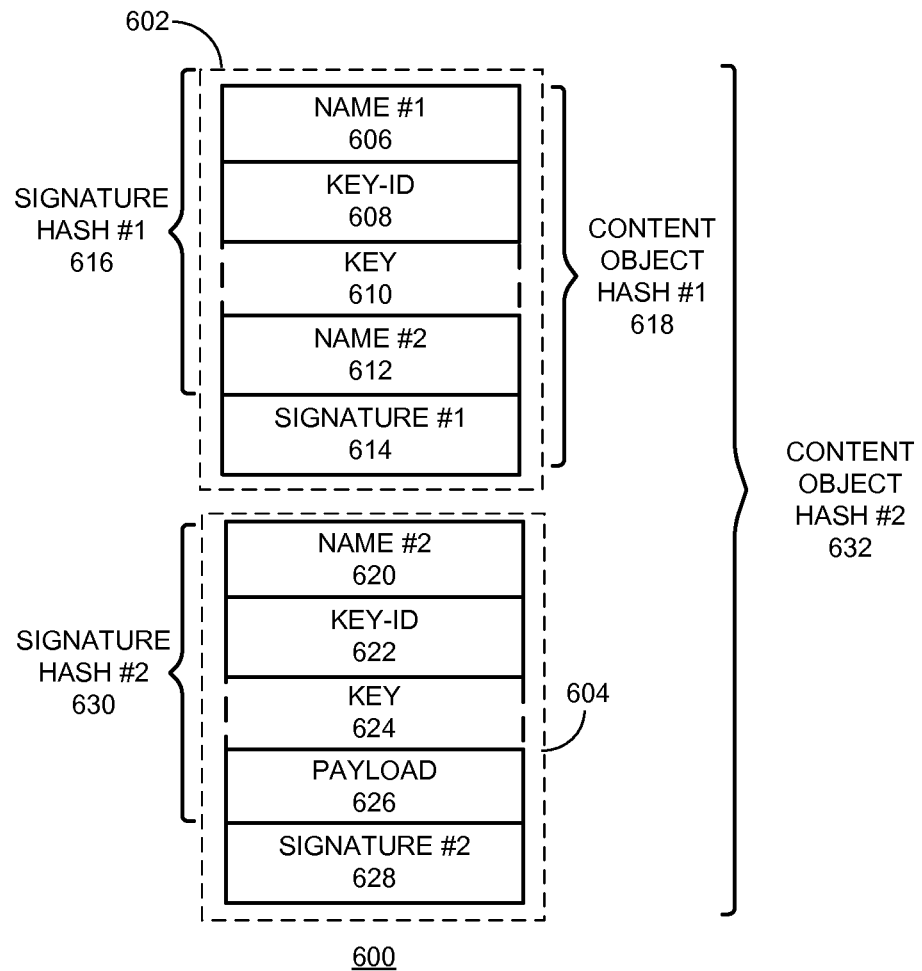
FIG. 6 presents a diagram illustrating an exemplary process of constructing a linked Content Object, in accordance with an embodiment of the present invention.

In some embodiments, instead of creating a specially formatted second portion, the second portion of the Content Object is a standard CCN Content Object, which can be cached separately from the first portion. FIG. 6 presents a diagram illustrating an exemplary process of constructing a linked Content Object, in accordance with an embodiment of the present invention. In FIG. 6, linked Content Object 600 includes a first portion 602 and a second portion 604. First portion 602 includes a name #1 component 606, a key-ID component 608, an optional key component 610, a name #2 component 612, and a signature #1 component 614. Note that first portion 602 is similar to first portion 502 shown in FIG. 5, except that nonce component 512 is replaced with name #2 component 612. Signature hash #1 component 616 is a hash value computed over name #1 component 606, key-ID component 608, optional key component 610, and name #2 component 612; and signature #1 component includes a signature signed (using a private key corresponding to the public included in key component 610) over signature hash #1 component 616. Content Object hash #1 component 618 is the hash value computed over the entire first portion.

In FIG. 6, second portion 604 is similar to the standard Content Object 200 shown in FIG. 2. More specifically, second portion 604 includes a name component (name #2 component 620, which is the same as name #2 component 612), a key-ID component 622, an optional key component 624, a payload component 626, and a signature #2 component 628. Signature #2 component 628 is a cryptographic signature signed over the signature hash #2 630, which is a hash value computed over name #2 component 620, key-ID component 622, optional key component 624, and payload component 626. Similar to the example shown in FIG. 5, the payload, and hence any possible external links included in the payload, are placed in second portion 604, and are not included in the computation of Content Object hash #1 618, making it possible to use the same Content Object hash #1 618 to refer to Content Object 600 even after the payload is modified.

The advantage of having a full Content Object as the second portion is that the two portions can now be cached or transferred separately. Once a recipient receives first portion 602, it obtains name #2 component 612, and can then request second portion 604 using name #2. Note that the CCN name for second portion 604 is name #2. In other words, first portion 602 acts as a link object, where the target of the link (name #2) is the name of another object (second portion 604).

Figure 7:
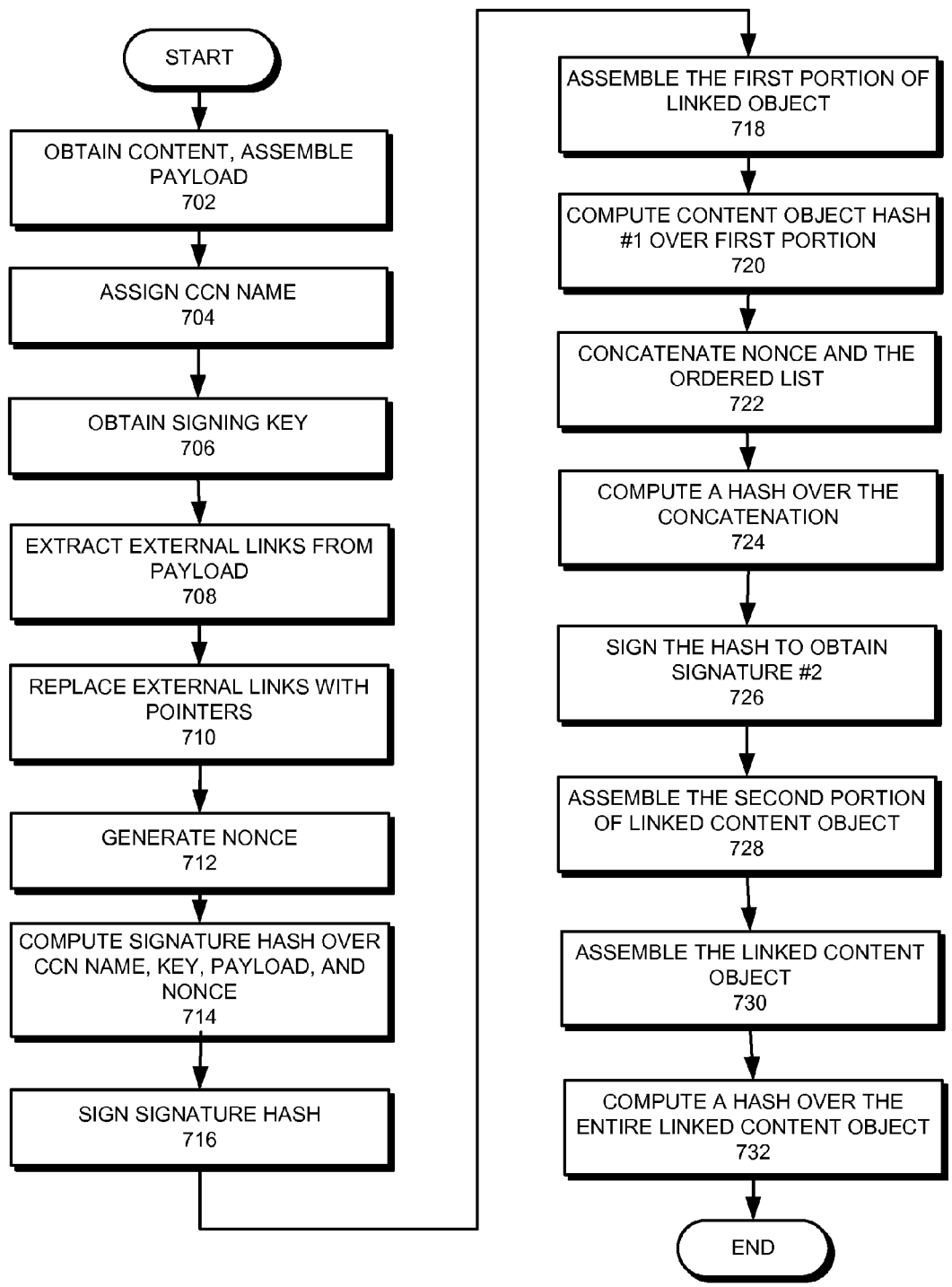
FIG. 7 presents a diagram illustrating an exemplary process of constructing a linked Content Object, in accordance with an embodiment of the present invention.

FIG. 7 presents a diagram illustrating an exemplary process of constructing a linked Content Object, in accordance with an embodiment of the present invention. During operation, a content publisher obtains content for publishing, and assembles the obtained content as the payload of a Content Object (operation 702). The content can include text, image, audio, and video content. Assembling the payload may include formatting the content to a desired publishing format. For example, for web content, the payload may be assembled into HTML elements. The system then assigns a CCN name for the Content Object (operation 704) and obtains a signing key (operation 706). The CCN name can be either hierarchical or flat. The signing key can be a public-private key pair, a symmetric key, or any other signing key that conforms with CCN requirements. If the signing key includes a public-private key pair, the system obtains an identifier (key-ID) of the public key.

Subsequently, the system extracts any external links included in the payload from the payload to form an ordered list of links (operation 708), and replaces the identified external links with pointers that point to the ordered list of links (operation 710). Note that the external links can include references to other Content Objects based on their hash-based names or content hashes. The system generates a nonce, which can be a random number or a cryptographic hash of the concatenation of the name and key-ID (operation 712).

The system then computes a hash value (called a signature hash) over the CCN name, the signing key, the payload (with replaced external links), and the nonce (operation 714), and signs the computed signature hash to obtain a signature #1 (operation 716). The system assembles the first portion of the linked Content Object by including the name, the signing key, the payload, the nonce, and the signature #1 (operation 718), and computes a Content Object hash #1 based on all components included in the first portion (operation 720). In some embodiments, the Content Object hash is computed using a SHA-256 hash function. Note that this Content Object hash #1 can be used by other Content Objects as reference for this Content Object.

Subsequent to the assembling of the first portion of the linked Content Object, the system assembles the second portion of the linked Content Object by concatenating the previously generated nonce and the previously extracted ordered list of links (operation 722), computes a hash value over the concatenation (operation 724), and signs, using the same signing key, the hash to obtain a signature #2 (operation 726). The nonce, the ordered list of links, and signature #2 are assembled to form the second portion of the linked Content Object (operation 728). Note that the ordered list of links can include multiple entries, and a respective entry can include a CCN name and a corresponding Content Object hash (calculated similarly as Content Object hash #1). The system then assembles the entire linked Content Object by concatenating the first portion and the second portion (operation 730), and computes a hash value over the entire object to obtain Content Object hash #2 (operation 732). Note that Content Object hash #2 may be used to refer to the linked Content Object if the publisher has published more than one object with the same first portion but different second portion.

In the example shown in FIG. 7, the system constructs the linked Content Object by replacing external hash-based links with pointers and placing the hash-based external links in the second portion of the Content Object, which is not included in the computation of the Content Object hash. In some embodiments, the system can also construct the linked Content Object by placing the entire payload (which includes the hash-based external links) in the second portion. The process for constructing such linked Content Object is similar to the process shown in FIG. 7, except that the first portion of the linked object no longer includes the payload, and the payload is assembled into the second portion of the linked object.

Linked Content Objects with Computable Hash Names

Figure 8A:
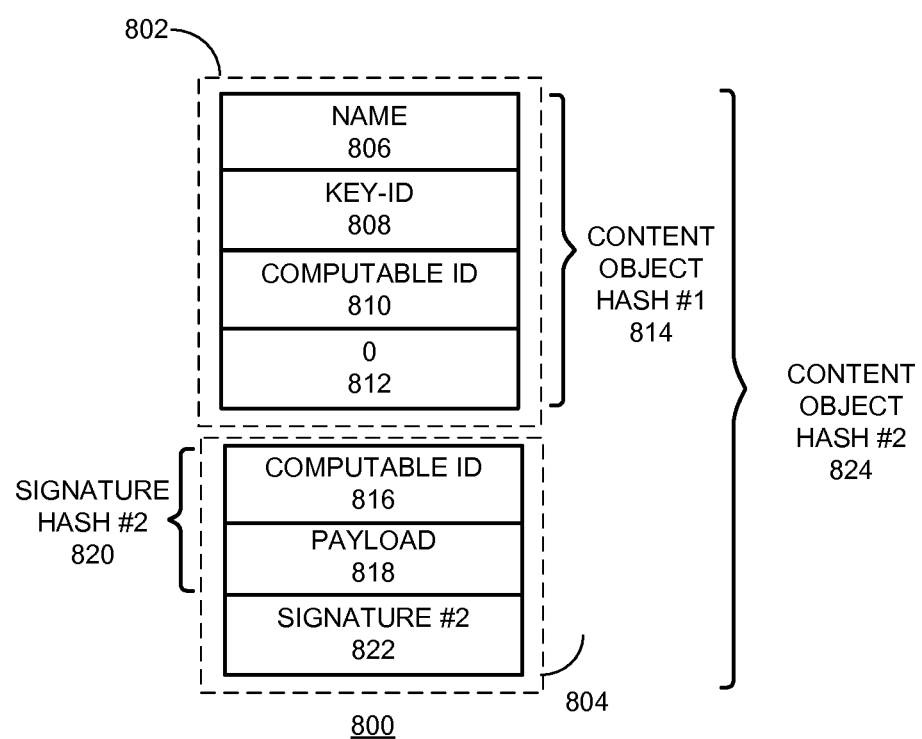
FIG. 8A presents a diagram illustrating an exemplary linked Content Object with a computable identifier, in accordance with an embodiment of the present invention.

In some embodiments of the present invention, a deterministic, pre-computable hash name is used as reference to a Content Object. This makes it possible for one to link to a remote Content Object without a priori knowledge of its content hash. FIG. 8A presents a diagram illustrating an exemplary linked Content Object with a computable identifier, in accordance with an embodiment of the present invention.

In FIG. 8A, linked Content Object 800 includes a first portion 802 and a second portion 804. First portion 802 includes a name component 806, a key-ID component 808, a computable identifier (ID) component 810, and a component 812 having a value of "0." Name component 806 is the CCN name of Content Object 800, and key-ID component 808 stores information associated with the signing key, such as the ID of the public key within a public-private key pair. Computable ID component 810 stores a value that can be determined based on name component 806 and key-ID component 808. In some embodiments, the system can obtain computable ID 810 based on a well-known function of name component 806 and key-ID component 808. In a further embodiment, the system can obtain computable ID 810 by applying a cryptographic hash function to the concatenation of name component 806 and key-ID component 808.

The rest of first portion 802 includes the zero-valued component 812, which indicates that first portion 802 does not have a cryptographic signature. Other predetermined values than "0" may also be stored in component 812. Content Object hash #1 component 814 is a hash value computed over name component 806, key-ID component 808, computable ID 810, and "0" component 812. Note that, because computable ID 810 is determined based on name component 806 and key-ID component 808, and "0" component 812 has a known "0" value, Content Object hash #1 814 is essentially determined by name component 806 and key-ID component 808. Hence, any remote nodes can calculate Content Object hash #1 814 as long as they know name component 806 and key-ID component 808, and use Content Object hash #1 808 to reference linked Content Object 800. Note that in previous examples shown in FIGS. 3-7, the remote node needs to obtain the Content Object hash from the publisher of a Content Object prior to making a reference to the Content Object.

In FIG. 8A, second portion 804 includes a computable ID component 816 (which is the same as computable ID 810), a payload component 818, and a signature #2 component 822. Payload component 818 includes the payload, hence any possible external links, of linked Content Object 800. Signature #2 822 is signed, using a signing key specified by key-ID 808, over a hash value computed based on computable ID 816 and payload 818 (which is signature hash #2 820). In some embodiments, the signing key includes a public-private key pair, key-ID 808 specifies the ID of the public key, and signature #2 822 is signed using the corresponding private key. Content Object hash #2 824 is a hash value computed over entire linked Content Object 800. Note that, although portion 802 and portion 804 have the same computable ID, the deterministic nature of the computable ID means that it cannot be used to verify the validity of second portion 804. Also note that "0" component 812 replaces signature #1 316 shown in FIG. 3, meaning that first portion 802 does not have a cryptographic signature. Therefore, the only binding between first portion 802 and second portion 804 is signature #2 822. A content consumer can verify authenticity of second portion 804 (hence the authenticity of the payload) by verifying signature #2 822. For example, if the content consumer receives a fake Content Object, which may have the correct CCN name and computable ID, the consumer may reject the Content Object if the signature #2 of the fake Content Object does not pass the authenticity test.

Note that in the example shown in FIG. 8A, Content Object hash #1 814, which can be used by other objects to reference linked Content Object 800, does not depend on payload 818. Therefore, such a reference remains constant even after the publisher of Content Object 800 updates the payload.

Figure 8B:
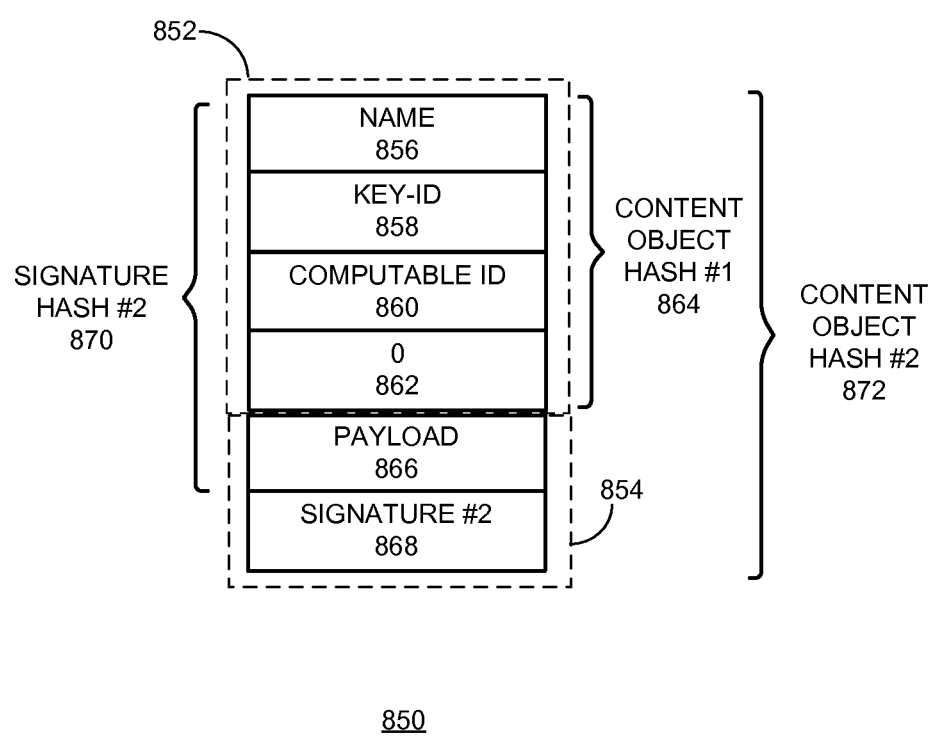
FIG. 8B presents a diagram illustrating an exemplary linked Content Object with a computable identifier, in accordance with an embodiment of the present invention.

Because the computable ID is deterministic, not acting as a binding agent between the two portions of the linked Content Object, in some embodiments, there is no need to repeat the computable ID in the second portion. FIG. 8B presents a diagram illustrating an exemplary linked Content Object with a computable identifier, in accordance with an embodiment of the present invention.

In FIG. 8B, linked Content Object 850 includes a first portion 852 and a second portion 854. First portion 852 is similar to first portion 802 shown in FIG. 8A, and includes a name component 856, a key-ID component 858, a computable identifier (ID) component 860, and a component 862 having a value of "0." Similar to Content Object hash #1 814, Content Object hash #1 component 864 is a hash value computed over name component 856, key-ID component 858, computable ID 860, and "0" component 862.

Second portion 854 includes a payload component 866 and signature #2 component 868. Payload component 866 includes the payload, hence any possible external links, of linked Content Object 850. Signature #2 868 is signed, using a signing key specified by key-ID 858, over a signature hash #2 870, which is a hash value computed over name 856, key-ID 858, computable ID 860, "0" component 862, and payload component 866. Signature #2 868 can be used by the content consumer to verify the authenticity of linked Content Object 850. Content Object hash #2 872 is a hash value computed over entire linked Content Object 850. In some embodiments, Content Object hash #1 and/or Content Object hash #2 are computed using cryptographic hash functions, such as a SHA-256 hash function or its equivalent.

Figure 9:
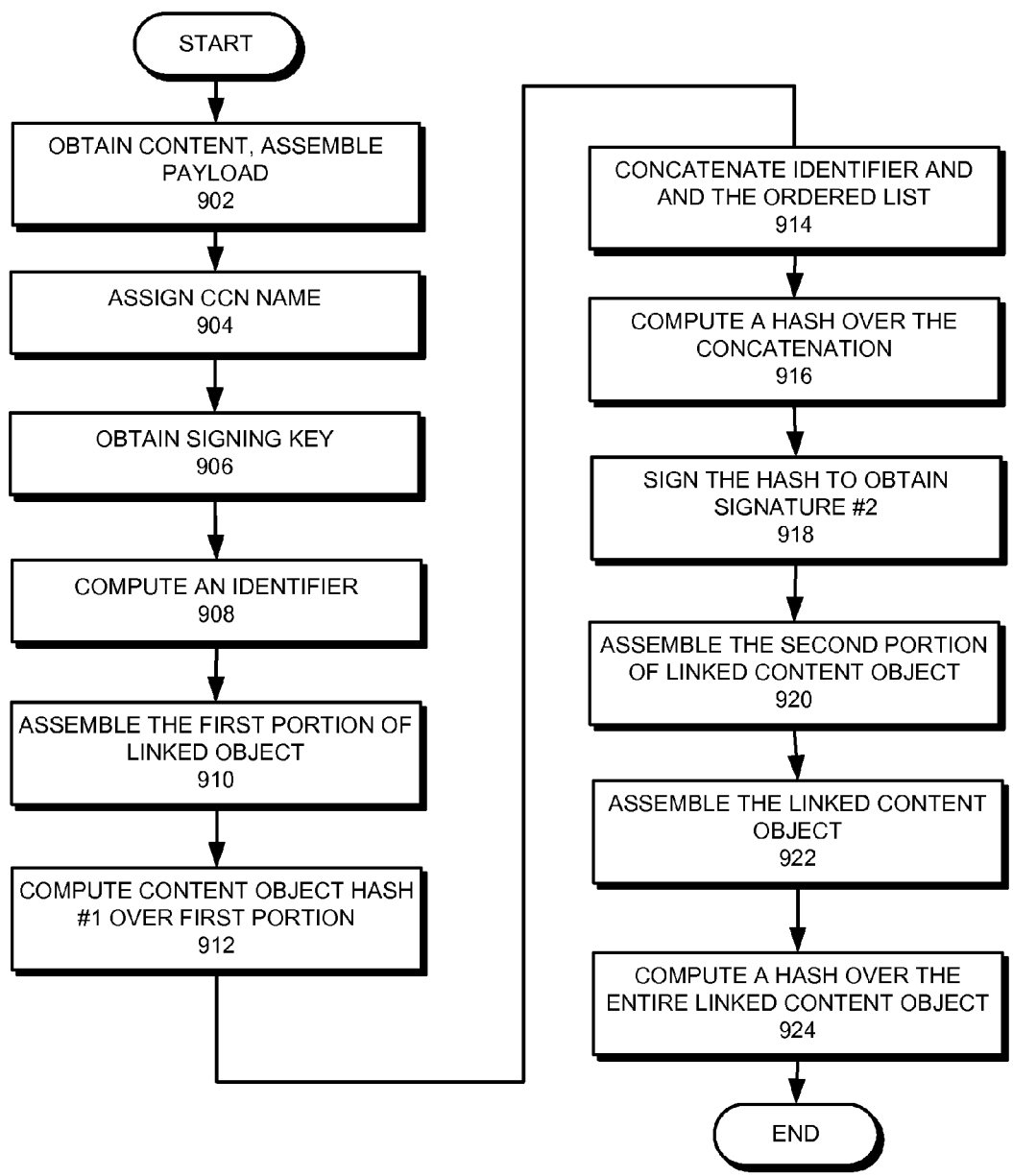
FIG. 9 presents a diagram illustrating an exemplary process of constructing a linked Content Object with a computable identifier, in accordance with an embodiment of the present invention.

FIG. 9 presents a diagram illustrating an exemplary process of constructing a linked Content Object with a computable identifier, in accordance with an embodiment of the present invention. During operation, a content publisher obtains content for publishing, and assembles the obtained content as the payload of a Content Object (operation 902). The content can include text, image, audio, and video content. Assembling the payload may include formatting the content to a desired publishing format. For example, for web content, the payload may be assembled into HTML elements. The system then assigns a CCN name for the Content Object (operation 904) and obtains a signing key (operation 906). The CCN name can be either hierarchical or flat. The signing key can be a public-private key pair, a symmetric key, or any other signing key that conforms with CCN requirements. If the signing key includes a public-private key pair, the system obtains an identifier (key-ID) of the public key. In some embodiments, the CCN names and key-IDs may have been known to remote nodes.

Subsequently, the system computes an identifier for the Content Object based on the CCN name and an identifier of the signing key (operation 908). In some embodiments, the computation involves applying a well-known hash function to the CCN name and the key-ID. Note that, because the CCN name and the key-ID can be known public information, a remote node can compute such an identifier without any a priori knowledge of the Content Object. The system then assembles the first portion of the linked Content Object by including the name, the key-ID, the computed identifier, and a known constant value (such as "0") (operation 910), and computes a Content Object hash #1 based on all components included in the first portion (operation 912). In some embodiments, the Content Object hash is computed using a SHA-256 hash function. Note that this Content Object hash #1 can be used by other Content Objects as a reference to this Content Object.

Subsequent to the assembling of the first portion of the linked Content Object, the system assembles the second portion of the linked Content Object by concatenating the computed identifier and the payload (operation 914), computes a hash value over the computed identifier and the payload (operation 916), and signs, using the same signing key specified by the key-ID, the hash to obtain a signature #2 (operation 918). The computed identifier, the payload, and signature #2 are assembled to form the second portion of the linked Content Object (operation 920). The system then assembles the entire linked Content Object by concatenating the first portion and the second portion (operation 922), and computes a hash value over the entire object to obtain Content Object hash #2 (operation 924). Note that Content Object hash #2 may be used to refer to the linked Content Object if the publisher has published more than one object with the same first portion but a different second portion.

Computer and Communication System

Figure 10:
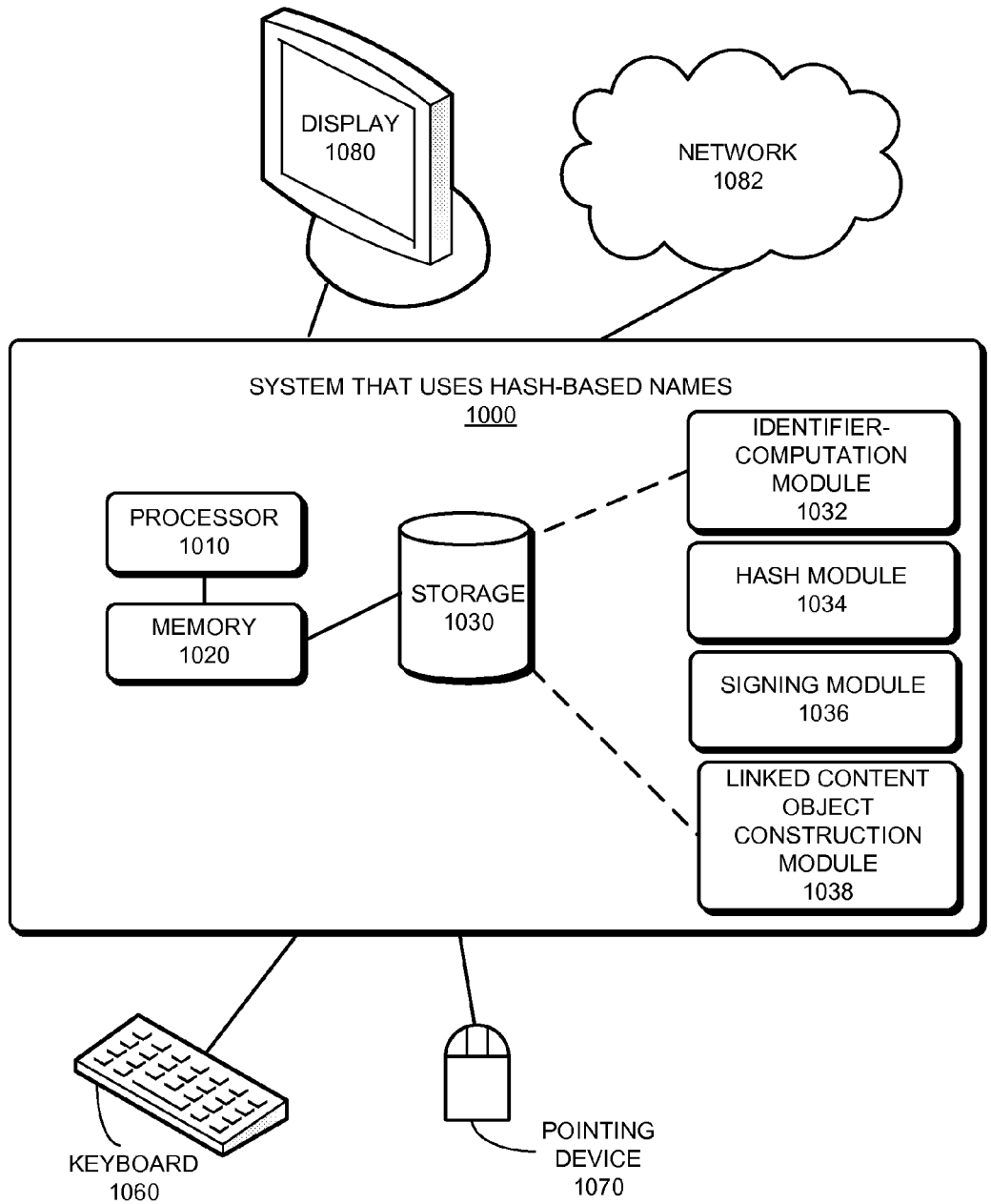
FIG. 10 illustrates an exemplary system that uses hash-based names to reference objects, in accordance with an embodiment of the present invention.

FIG. 10 illustrates an exemplary system that uses hash-based names to reference objects, in accordance with an embodiment of the present invention. A system 1000 that uses hash-based names comprises a processor 1010, a memory 1020, and a storage 1030. Storage 1030 typically stores instructions that can be loaded into memory 1020 and executed by processor 1010 to perform the methods mentioned above. In one embodiment, the instructions in storage 1030 can implement an identifier-computation module 1032, a hash module 1034, a signing module 1036, and a linked Content Object Construction module 1038, all of which can be in communication with each other through various means.

In some embodiments, modules 1032-1038 can be partially or entirely implemented in hardware and can be part of processor 1010. Further, in some embodiments, the system may not include a separate processor and memory. Instead, in addition to performing their specific tasks, modules 1032-1038, either separately or in concert, may be part of general- or special-purpose computation engines.

Storage 1030 stores programs to be executed by processor 1010. Specifically, storage 1030 stores a program that implements a system (application) for facilitating object referencing based on computable IDs. During operation, the application program can be loaded from storage 1030 into memory 1020 and executed by processor 1010. As a result, system 1000 can perform the functions described above. System 1000 can be coupled to an optional display 1080 (which can be a touch screen display), keyboard 1060, and pointing device 1070; system 1000 can also be coupled via one or more network interfaces to network 1082.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method, the method comprising:
   constructing a first portion of a linked object for sending content over a content-centric network, wherein the first portion includes one or more data items and a computable identifier for the linked object calculated based on the one or more data items;
   deriving a unique name for the linked object based on the first portion of the linked object; and
   constructing a second portion of the linked object, wherein the second portion includes at least the computable identifier and an external link that references a second linked object using a second unique name associated with the second linked object, wherein the second unique name is derived based on a first portion of the second linked object.

2. The method of claim 1, wherein the computable identifier is obtained by computing a hash value over the one or more data items.

3. The method of claim 1, wherein the unique name associated with the linked object is a hash-based name obtained by applying a hash function to the first portion.

4. The method of claim 3, wherein the hash function includes a cryptographic hash function.

5. The method of claim 1, wherein the first portion further comprises a component with a pre-determined value.

6. The method of claim 1, wherein the one or more data items include a name and a signing key.

7. The method of claim 6, wherein the second portion further includes a cryptographic signature obtained using the signing key.

8. The method of claim 1, wherein the second linked object includes a link that references the linked object using the unique name associated with the linked object, thereby facilitating a circular reference between the linked object and the second linked object.

9. The method of claim 1, wherein constructing the first portion of the linked object further comprises constructing the one or more data items from to-be-delivered content that includes at least one link to other content, and wherein constructing the one or more data items involves replacing the link to the other content with a predetermined pointer that points to the external link included in the second portion.

10. A non-transitory computer-readable storage medium storing instructions that when executed by a computing device cause the computing device to perform a method, the method comprising:
    constructing a first portion of a linked object for sending content over a content-centric network, wherein the first portion includes one or more data items and a computable identifier calculated based on the one or more data items;
    deriving a unique name for the linked object based on the first portion of the linked object; and
    constructing a second portion of the linked object, wherein the second portion includes at least the computable identifier and an external link that references a second linked object using a second unique name associated with the second linked object, wherein the second unique name is derived based on a first portion of the second linked object.

11. The computer-readable storage medium of claim 10, wherein the computable identifier is obtained by computing a hash value over the one or more data items.

12. The computer-readable storage medium of claim 10, wherein the unique name associated with the linked object is a hash-based name obtained by applying a hash function to the first portion.

13. The computer-readable storage medium of claim 12, wherein the hash function includes a cryptographic hash function.

14. The computer-readable storage medium of claim 10, wherein the first portion further comprises a component with a pre-determined value.

15. The computer-readable storage medium of claim 10, wherein the one or more data items include a name and a signing key.

16. The computer-readable storage medium of claim 15, wherein the second portion further includes a cryptographic signature obtained using the signing key.

17. The computer-readable storage medium of claim 10, wherein the second linked object includes a link that references the linked object using the unique name associated with the linked object, thereby facilitating a circular reference between the linked object and the second linked object.

18. A computer system comprising:
   a processor; and
   a storage device coupled to the processor and storing instructions which when executed by the processor cause the processor to perform a method, the method comprising:
      constructing a first portion of a linked object for sending content over a content-centric network, wherein the first portion includes one or more data items and a computable identifier calculated based on the one or more data items;
      deriving a unique name for the linked object based on the first portion of the linked object; and
      constructing a second portion of the linked object, wherein the second portion includes at least the computable identifier and an external link that references a second linked object using a second unique name associated with the second linked object, wherein the second unique name is derived based on a first portion of the second linked object.

19. The system of claim 18, wherein the computable identifier is obtained by computing a hash value over the one or more data items.

20. The system of claim 18, wherein the unique name associated with the linked object is a hash-based name obtained by applying a hash function to the first portion.

21. The system of claim 20, wherein the hash function includes a cryptographic hash function.

22. The system of claim 18, wherein the first portion further comprises a component with a pre-determined value.

23. The system of claim 18, wherein the one or more data items include a name and a signing key.

24. The system of claim 23, wherein the second portion further includes a cryptographic signature obtained using the signing key.

25. The system of claim 18, wherein the second linked object includes a link that references the linked object using the unique name associated with the linked object, thereby facilitating a circular reference between the linked object and the second linked object.

* * * * *